(12) United States Patent
Greenaway et al.

(10) Patent No.: US 6,389,187 B1
(45) Date of Patent: May 14, 2002

(54) OPTICAL FIBER BEND SENSOR

(75) Inventors: Alan H Greenaway; James G Burnett; Andrew R Harvey, all of Malvern; Peter A Lloyd, Farnborough; Roy McBride, Edinburgh; Philip St John Russell, Bath; Paul M Blanchard, Malvern, all of (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/446,325

(22) PCT Filed: Jun. 17, 1998

(86) PCT No.: PCT/GB98/01780

§ 371 Date: Apr. 21, 2000

§ 102(e) Date: Apr. 21, 2000

(87) PCT Pub. No.: WO98/59219

PCT Pub. Date: Dec. 30, 1998

(30) Foreign Application Priority Data

Jun. 20, 1997 (GB) .............................................. 9713018

(51) Int. Cl.⁷ ................................................. G02B 6/00
(52) U.S. Cl. ....................................................... 385/13
(58) Field of Search ................ 385/12, 13; 250/227.14, 250/227.16, 227.19, 227.27

(56) References Cited

U.S. PATENT DOCUMENTS

| 5,367,583 A | 11/1994 | Sirkis | 385/12 |
| 5,420,688 A | * 5/1995 | Farah | 356/358 |
| 5,563,967 A | 10/1996 | Haake | 385/12 |

FOREIGN PATENT DOCUMENTS

| EP | 0 040 706 | 12/1981 |
| WO | 96 08695 | 3/1996 |

OTHER PUBLICATIONS

F. Farahi Et Al: "Coherenc Multiplexing of Remote Fibre Optic Fabry–Perot Sensing System." Optics Communications, vol. 65, No. 5, Mar. 1, 1988, pp. 319–321. XP002076446 Amsterdam, The Netherlands see p. 319–p. 321; figure 1.

Patent Abstracts of Japan vol. 9, No. 101 (P–353) 1824!, May 2, 1985 & JP 59 226832 A (Yokogawa Hokushin Denki K.K.), Dec. 20, 1984 see abstract.

S.H. Song, E.H. Lee: "Planar optical configurations for crossover interconnects" Optics Letters, vol. 20, No. 6, Mar. 15, 1995, pp. 617–617–619, XP000493641 New York, NY, US see page 617, paragraph 2—p. 618, paragraph 2; figure 1A, 1B.

* cited by examiner

*Primary Examiner*—Cassandra Spyrou
*Assistant Examiner*—Alessandro V. Amari
(74) *Attorney, Agent, or Firm*—Nixon & Vanderhye P.C.

(57) ABSTRACT

An optical fiber bend sensor (10) measures the degree and orientation of bending present in a sensor length (30) portion of a fiber assembly (26). Within a multicored fiber (30, 32, 34), cores (62, 66) are grouped in non-coplanar pairs. An arrangement of optical elements (28, 36, 38) define within each core pair (62, 66) two optical paths (122, 124) which differ along the sensor length (30): one core (62) of a pair (62, 66) is included in the first path (122), and the other core (66) in the second path (124). A general bending of the sensor region (30) will lengthen one core (62, 66) with respect to the other. Interrogation of this length differential by means of interferometry generates interferograms from which the degree of bending in the plane of the core pair is extracted. Bend orientation can be deduced from data extracted from multiple core pairs.

27 Claims, 6 Drawing Sheets

OPTICAL FIBER BEND SENSOR

This invention relates to an optical fibre bend sensor.

A deformation of an optical fibre results in strain developing within the fibre. Strains can be categorised depending on the nature of the distortion which produces them. A longitudinal strain: a one-dimensional expansion or compression of the fibre along its length, is categorised as a scalar strain. A scalar strain by its nature requires only one parameter, the magnitude of strain along the axis of the stretch or compression, to characterise it. In terms of the strain tensor ($\epsilon$) this longitudinal strain is the tensile component $\epsilon_{zz}$.

If however a fibre is also free to deform in a transverse plane i.e. that perpendicular to the length of the fibre, further components of the general strain tensor will have effect. If the fibre is restrained in its position, tensile strain ($\epsilon_{xx}$, $\epsilon_{yy}$) arises within a compressed or stretched fibre in perpendicular directions to the longitudinal strain described above. This is known as transverse strain.

More generally, if the fibre is not fixed rigidly in location, one end of the fibre may then be displaced with respect to the other. Such a displacement occurs in three dimensions and results in a "bending" of the fibre. Both this bend and three-dimensional tensile strain require characterisation by both magnitude and direction. In the simple case of a bend with negligible fibre elongation, the induced strain is conveniently described in terms of the bend magnitude and plane of curvature. This curvature ($\kappa$) has magnitude equal to 1/R, where R is the radius of curvature, and direction defined by the normal vector pointing towards the centre of curvature. Assuming a linear strain gradient across the bend then, in mathematical terms, the deformation developed in bending is formally equivalent to the transverse strain gradient: $\Delta_t \epsilon_{zz}$, where $\Delta_t$ is the transverse gradient operator.

Optical fibre sensors for strain measurement are known in the prior art. An optical fibre is embedded in or surface-bonded to the structure to be monitored and its optical properties observed. The monitored structure is not limited to engineering applications e.g. aeroplane structures, building walls; optical strain sensors have been found useful in the medical field. A number of external influences may cause strain to develop within a structure: applied stress (elasticity) and electric field (piezoelectricity) to name two. An optical fibre within such a strained structure will in turn experience the effects of such strains. Transverse strain components will affect the refractive index and longitudinal strain components will also stretch (or compress) the fibre. In either case the optical path length of radiation propagating within the fibre is changed. Thus information pertaining to strain within the monitored structure is manifest in the phase of radiation propagating within the fibre and is therefore extractable using interferometric techniques. Optical strain sensing is particularly attractive because interferometry offers an accurate detection tool and the sensitivity of optical properties to physical influences such as strain and temperature is high.

Temperature has a similar effect to strain on an optical fibre. Thermal expansion will change the length and refractive index of the fibre and additional strains may also be induced by the differential expansion of fibre and host material. Any optical technique purporting to measure strain must make allowance for this cross-sensitivity between temperature and strain.

A problem with prior art interferometric strain sensing techniques such as that described in patent application GB9606785.5 is that a single probe fibre measures only a scalar component of strain—the elongation of the fibre length. Transverse strain components are not measured and a general three dimensional contortion of a fibre is detectable only as a change in fibre length. Fibres have been multiplexed both in parallel and series in order to provide scalar strain measurements across a range of positions. From data gathered from an array of such single probes a map of strain gradient may be built up. However each probe intrusion inevitably weakens the structure being monitored. The interface region will be subject to increased strain and there is a clear benefit to be had in limiting the number of such interfaces.

Strain gradient measurements have been performed from sea-going vessels using a number of magnetic bearing sensors interspersed with depth sensors on a towed sonar array. However such arrays are very bulky, occupying considerable storage space when not in use and such considerations limit the practical length of the array.

Furthermore magnetic bearing sensors as currently used are affected by perturbation of the local magnetic field. Measurements are therefore influenced by metallic structures on the sea bed as the array passes above.

An optical fibre sensing device sensitive to the degree of fibre bending is disclosed in U.S. Pat. No. 4,443,698. The interference pattern developed between light propagating in two different cores of a multicore fibre. is used to monitor changes in the bending of the fibre. If two cores are used then a helical 90°-twist about each other is incorporated over the sensing region. This allows the fibre to be sensitive to bending regardless of bend plane, but removes any capability of measuring bend direction. With three or more non-coplanar cores the need for such a twist can be avoided. The invention employs phase tracking techniques to follow varying bend parameters in order to allow deduction of unambiguous measurements. However, tracking requires access to one of the interferometer optical paths, a clear disadvantage for applications that require remote addressing of passive sensing lengths. In this case. bend direction information will be lost. Tracking will also be lost if power is not continuously maintained.

There is a perceived need for non-intrusive shape sensing by means of bend measurement. Such a sensor would have many applications in diverse fields. In robotics, knowledge of the absolute position of moving parts is essential. This can be deduced if directional bending of an integrated fibre can be measured. In medical applications, any internal monitoring is safest with minimal intrusion from a foreign probe and, additionally negligible generation of external electromagnetic fields, Lightweight position monitoring is essential to promote mobility in an artificial limb. Prior art optical strain sensors do not measure strain gradients and prior art shape sensors are overly bulky and generally rely on magnetic effects which have neither the accuracy nor immunity from environmental perturbation afforded by optical measurement.

It is an object of this invention to provide an alternative form of bend sensor.

The present invention provides a bend sensor incorporating a multicore fibre assembly having first and second component cores and being arranged to convey radiation to and from a sensor length comprising a bend sensing region of the fibre assembly and thereafter to analysing means arranged to analyse radiation output from the fibre assembly, characterised in that the fibre assembly incorporates coupling means for coupling radiation propagating from the sensor length in the first core to the second core for return to the sensor length, and reflecting means arranged to define the sensor length by at least partial reflection of radiation thereat in both cores, wherein the reflecting means and coupling means are arranged to define first and second optical paths each of which traverses the sensor length in a respective one of the cores but not the other, and the analysing means is arranged to disperse interferograms formed between radiation contributions which have traversed the optical paths.

This invention provides the advantages of accuracy and relatively non-intrusive bend measurement. Optical fibre assemblies can be produced with very small diameter and embedding within a structure will thus result in minimal disruption of that structure. The apparatus is capable of determining bending of the sensor length, perhaps as a consequence of strain within an embedding structure, by monitoring that component of the bend in the plane of two fibre cores within the sensor length. Interferograms are formed between radiation propagating along two different optical paths, the optical paths differing within a specific region of the fibre. This region, the sensor length, may be only a fraction of the total fibre length. Generally, bending this sensing region will inevitably lengthen one core with respect to the other. Interrogation of this length differential by means of interferometry provides an accurate tool with which to measure bending. Moreover, defining a sensor length down a potentially long fibre downlead enables strains to be detected at a localised region remote from the radiation input end of the fibre. Thus the fibre assembly can be incorporated in, for example, a building wall, and strains developing in the deep interior of the wall measured.

The first and second cores constitute a core pair and component cores of the multicore fibre preferably comprise an arrangement of such core pairs; and the coupling means may accordingly be arranged to couple and reflect a portion of radiation propagating in the first core into the second core of the respective core pair.

This provides the advantage of flexibility. The optical path difference arising between any core pair can be interrogated, and this embodiment therefore provides a selection of planes any of which may be the plane in which components of a general bend curvature are measured.

The sensor may also include signal processing means arranged to extract interferogram phase variation from the dispersed interferograms and to calculate bend curvature ($\kappa$) of the sensor length from the phase variation. This provides the advantages of speed and accuracy generally to be had from signal processing power in extracting a useful parameter, bend curvature $\kappa$, from interferometric data.

In a preferred embodiment, respective interferograms are generated from radiation propagating within each core pair, each interferogram arising from differences in respective first and second optical path lengths; and the resultant calculated bend curvature ($\kappa$) is that component of bend curvature ($\kappa_x$, $\kappa_y$) in a plane containing the sensor length respective core pair. Moreover, the multicore fibre preferably comprises at least two core pairs contained in non-coincident planes, thereby enabling calculation of absolute bend magnitude and orientation from corresponding in-plane components of bend curvature.

Such use of multiple core pairs enables bend plane to be advantageously determined. A single core pair can be used to obtain a measurement only of a general three dimensional curvature projected onto a specific plane: that of the core pair. However measurement of two non-coplanar projections, by means of two non-coplanar core pairs, enables both the degree of curvature and the orientation of the plane of the curve to be deduced. Preferably, the two non-coplanar core pairs are contained in orthogonal planes. This maximises the likelihood of an accurate measurement of any bend direction within a general three-dimensional volume. If more than two core pairs are used to measure multiple projections of a single curvature, magnitude and orientation determination can be made with increased accuracy.

It is preferred that the cores within each pair have unequal effective refractive indices. This enable bend "handedness" to be determined in cases of which it is ambiguous. Although bend magnitude can be determined using a single core pair of equal refractive index, such an arrangement cannot distinguish between a bend to the night and a bend to the left i.e. there is no indication of which particular core of the pair is compressed However, by arranging for the cores to be distinguishable in terms of optical path length, a means for determining which of the pair is compressed is provided. The optical path difference measured by this embodiment of the invention is now dependent on the direction of the bend.

There are a number of known ways of producing unequal core effective refractive indices. For example, they may be produced during manufacture of the fibre, i.e. by using slightly different levels of doping per core, or after manufacture by injecting high intensity UV-radiation into one of the cores for a short time. The latter technique has the effect a slightly increasing the refractive index of the core in a similar way to Bragg grating manufacture, and also offers more flexibility.

The multicored fibre is preferably a bunched multiple monomode (BMM) fibre. Such fibres are known and comprise multiple fibre cores, each with an associated cladding "region". Each cladding region is smaller in cross-sectional area than would be required for typical cladding of cylindrical symmetry. This enables the cores to be more closely spaced than previously permitted, with regard to the requirements for avoiding crosstalk. This in turn results in an overall reduction of the diameter of a multicore cable. This is advantageous lo many applications of bend sensing in which it is desirable to minimise the disruption to a structure under observation by intrusion of a probe.

The component cores may be stress-induced highly birefringent (HiBi) cores. This provides the sensor with the capability of discriminating between the effects of temperature and strain.

Alternatively, the multicored fibre may be a photonic crystal fibre. This again provides the advantage of compactness. A photonic crystal fibre is another example of a multicored fibre in which crosstalk can be kept to an acceptable level, but overall fibre diameter is reduced in relation to a traditionally structure fibre bundle.

In a preferred embodiment the fibre assembly is arranged to receive incident broadband radiation and the analysing means is arranged to form a channelled spectrum by dispersing interferograms formed between radiation propagating in the first and second optical paths as a function of wavelength. Suitable broadband radiation may be provided by a superluminescent diode, an Erblum Doped Fibre Amplifier or a Praseodymium light source. These sources do not all operate over the same wavelength range and appropriate detectors need to be used in each case. Interferometic techniques rely on measuring changes across the interference pattern as a function of the phase of the radiation forming it. It is therefore necessary to scan across a range of phase angles. Commonly optical path difference is scanned, although are equivalent phase scan may be achieved by scanning radiation wavelength. Thus, whereas a Michelson interferometer scans optical path difference at constant wavelength, this embodiment of the invention scans radiation wavelength at constant optical path difference. The principal advantage of this implementation is that it requires neither an external reference path nor any motion of the sensing length, which would be impracticable in many applications, to compensate for the optical path difference introduced by the bend. This reduces the ancillary apparatus required to interrogate the sensing fibre once it has been embedded in a structure.

Alternatively the sensor may also include a scanning interferometer arranged to perform a scan of optical path lengths defined within and whereby interferometer optical path differences compensate for the optical path difference between first and second optical paths and the analysing means is arranged to disperse interferograms formed between radiation propagating in the first and second optical paths (122, 124) as a function the interferometer scan. The interferometer may be arranged to perform either a spatial or temporal scan.

The component cores may be distributed in a symmetrical arrangement within the multicore fibre. The fibre is preferably less than 130 μm in diameter.

The coupling means is preferably a tandem coupler. A tandem coupler is an optical element which reflects a proportion of the radiation incident on it from one direction, transmits another proportion and at the same time couples the reflected radiation into another fibre core. These optical properties make the device eminently suitable for defining an optical path which encompasses two fibre cores, such as is required for embodiments of this invention in which the sensing fibre length is addressed via a download in which the cores define common beam paths.

The tandem coupler preferably incorporates a beamsplitter wherein the beamsplitter comprises a base and, non-coplanar with this, respective pairs of planar surface faces for each core pair wherein each planar surface face extends from the base towards an apex and faces within each pair are mutually disposed at approximate right angles. Such a beamsplitter conveniently provides in a single component the reflection and transmission characteristics required for the functioning of the tandem coupler.

The multicored fibre may have four symmetrically oriented component cores and the beamsplitter may comprise a square base, four triangular surface faces and an apex wherein each triangular face extends from one side of the square base to the apex and the perpendicular distance from the apex to the base is one half of the distance of ore side of the base. Such a symmetric arrangement of cores means that the same accuracy of measurement can be had regardless of bend plane orientation.

Within the tandem coupler the beamsplitter may be located intermediate to first and second planar microlens arrays wherein each microlens array includes a respective microlens located a focal distance away from each component core and wherein the microlenses of each array are arranged in a common plane and the common planes of each lens array are mutually parallel and parallel to the base of the beamsplitter. The microlenses in these arrays thus either produce a collimated beam from radiation exiting the cores, or couple collimated radiation into the fibre cores. This aids operation of the tandem coupler.

A further aspect of the invention provides a temperature sensor incorporating a multicore fibre assembly having first and second component cores and being arranged to convey radiation to and from a sensor length comprising a bend sensing radiation output from the fibre assembly characterised in that the fibre assembly comprises: a multicored optical fibre having component cores which are sufficiently separated to counteract crosstalk; coupling means for coupling radiation propagating in a first core into a second core of the fibre; and reflecting means arranged to reflect a portion of incident radiation; wherein the reflecting means and coupling means are arranged to define first and second optical paths within the fibre assembly such that the paths have an optical path difference developed over a sensor length section of the fibre within which the first optical path corresponds to radiation propagation in the first core and the second optical path corresponds to radiation propagation in the second core; and the analysing means is arranged to disperse interferograms formed between radiation propagating in the first and second optical paths.

In another aspect, this invention provides a beamsplitter comprising a base and, non-coplanar with this, respective pairs of planar surface faces wherein each planar surface face extends from the base towards an apex and faces within each pair are mutually disposed at approximate right angles. Such a beamsplitter conveniently provides reflection and transmission characteristics which are appropriate to various optical applications.

The beamsplitter may be for reflecting a component of radiation propagating in a first core of a multicored fibre into a second core of the fibre, first and second cores comprising an opposite core pair, wherein each opposite core pair is aligned with a respective pair of beamsplitter planar surface faces such that an optical path exists from the first core to the second core via reflections from the planar surface faces.

Preferably, the multicored fibre has four symmetrically oriented component cores and the beamsplitter has a square base, four triangular surface faces and an apex wherein each triangular face extends from one side of the square base to the apex and the perpendicular distance from the apex to the base is one half of the distance of one side of the base.

A tandem coupler may incorporate a beamsplitter in accordance with the above description located intermediate to first and second planar microlens arrays wherein each microlens array includes a respective microlens located a focal distance away from each component core and wherein the microlenses of each array are arranged in a common plane and the common planes of each lens array are mutually parallel and parallel to the base of the beamsplitter. Such a tandem coupler has many applications in devices in which it is required to define an optical path encompassing two fibre cores In order that the invention might be more fully understood, an embodiment thereof will now be described with reference to the accompanying drawings in which:

Figure 1:
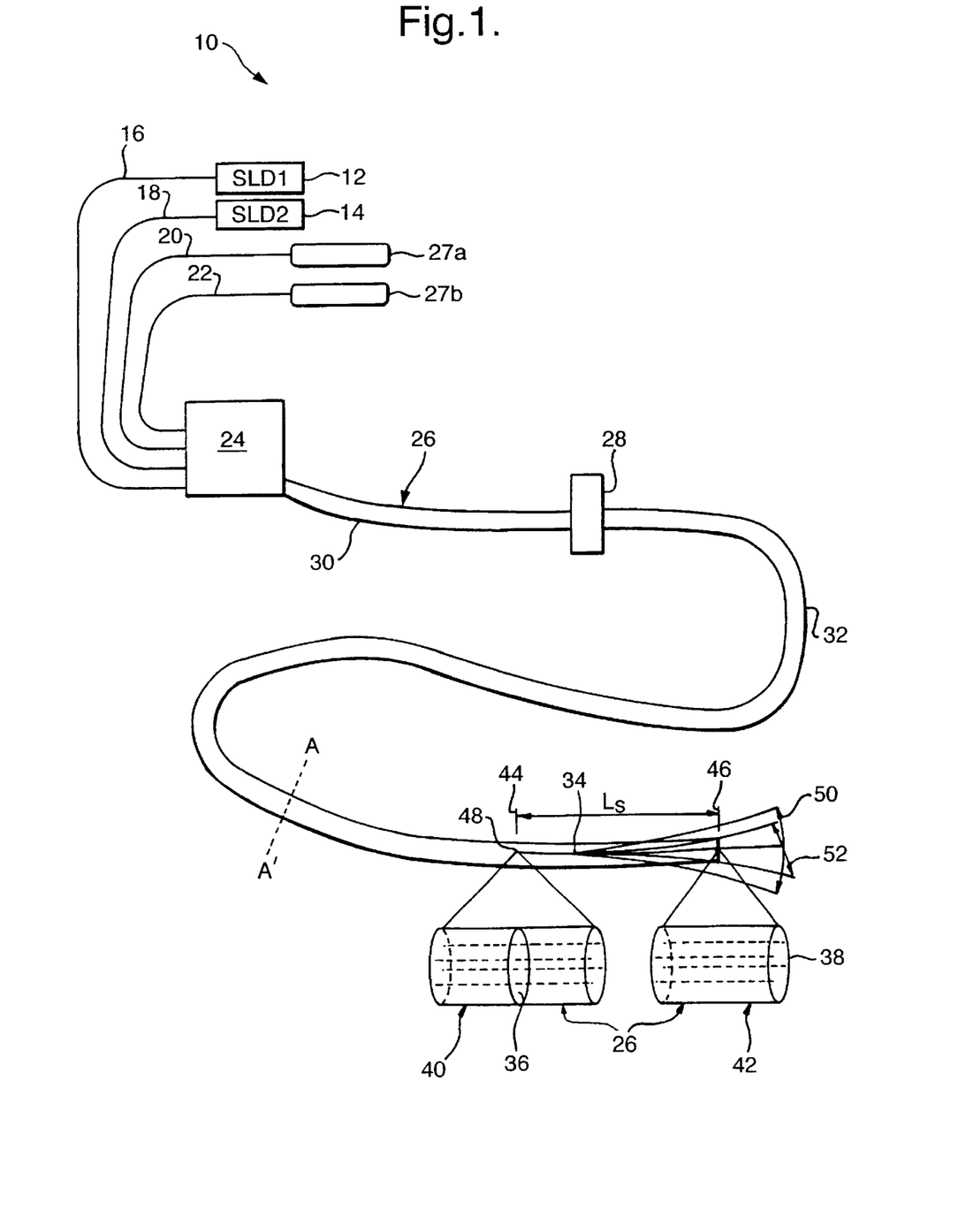
FIG. 1 is a schematic illustration of the components of the bend sensor.

With reference to FIG. 1, an optical fibre bend sensor of the invention for making vector strain measurements is illustrated generally by 10. The sensor 10 incorporates a pair of fibre pigtailed superluminescent diodes 12, 14 connected to a respective pair of input monomode optical fibres 16, 18. Superluminescent diodes (SLDs) are particularly intense sources of broadband radiation. Suitable diodes 12, 14 for use in this invention are supplied by Superlum Ltd., SLD-361/A-TO-SM, with wavelength range centred at 825 nm and FWHM bandwidth of 18 nm. The input monomode fibres 16, 18 and two output monomode fibres 20, 22 are connected via a fan-out connector 24 to respective cores of a 4-core Bunched Multiple Monomode (BMM) fibre assembly 26. Each output monomode fibre 20, 22 is also connected at its opposite end to a fibre optic linked spectrometer 27a, 27b. Both fan-out connectors and BMM fibres are known and described in Opto and Laser Europe, issue 23, p29 (September 1995). The BMM fibre assembly 26 comprises a tandem coupler 28; three 4-core BMM fibres: a first length 30, sensor downlead 32 and sensor length 34; a semi-reflective splice 36 through the fibre assembly 26; and a silvered mirror 38 coating the fibre assembly 26 end. The cores of the first length 30 of BMM fibre are those connecting the assembly to the fan-out connector 24. At their opposite ends the first length 30 cores are optically connected to the tandem coupler 28. The sensor downlead 32 is the fibre section of the assembly 26 extending from the tandem coupler 28 to the semi-reflective splice 36 and the sensor length 34 extends thereafter to the silvered mirror 38 coating the fibre end. The sensor length 34 corresponds to a fibre of length $L_s$ at the extreme end of the fibre assembly, distant from the input connections. Enlarged views 40, 42 are shown of the 4-core BMM fibre assembly 26 at the semi-reflective splice 36 and the mirrored end 38 locations 44, 46. The splice 36 and mirrored end 38 exhibit negligible absorption and have reflectances of approximately ⅓ and 1 respectively. The BMM fibre assembly 26 is flexible and fashionable into a variety of conformations. Specifically, bending of the sensor length 34 occurs with respect to a pivot point 48 located at the centre of the fibre at the position 44 of the splice 36. Any bending of the sensor length 34 about this pivot 48 is resolvable into components of curvature 50, 52 in two mutually perpendicular planes, each component having a respective radius of curvature $R_x$, $R_y$ (not illustrated). The orientation of these components 50, 52 with respect to the BMM fibre cores will be described later.

Figure 2:
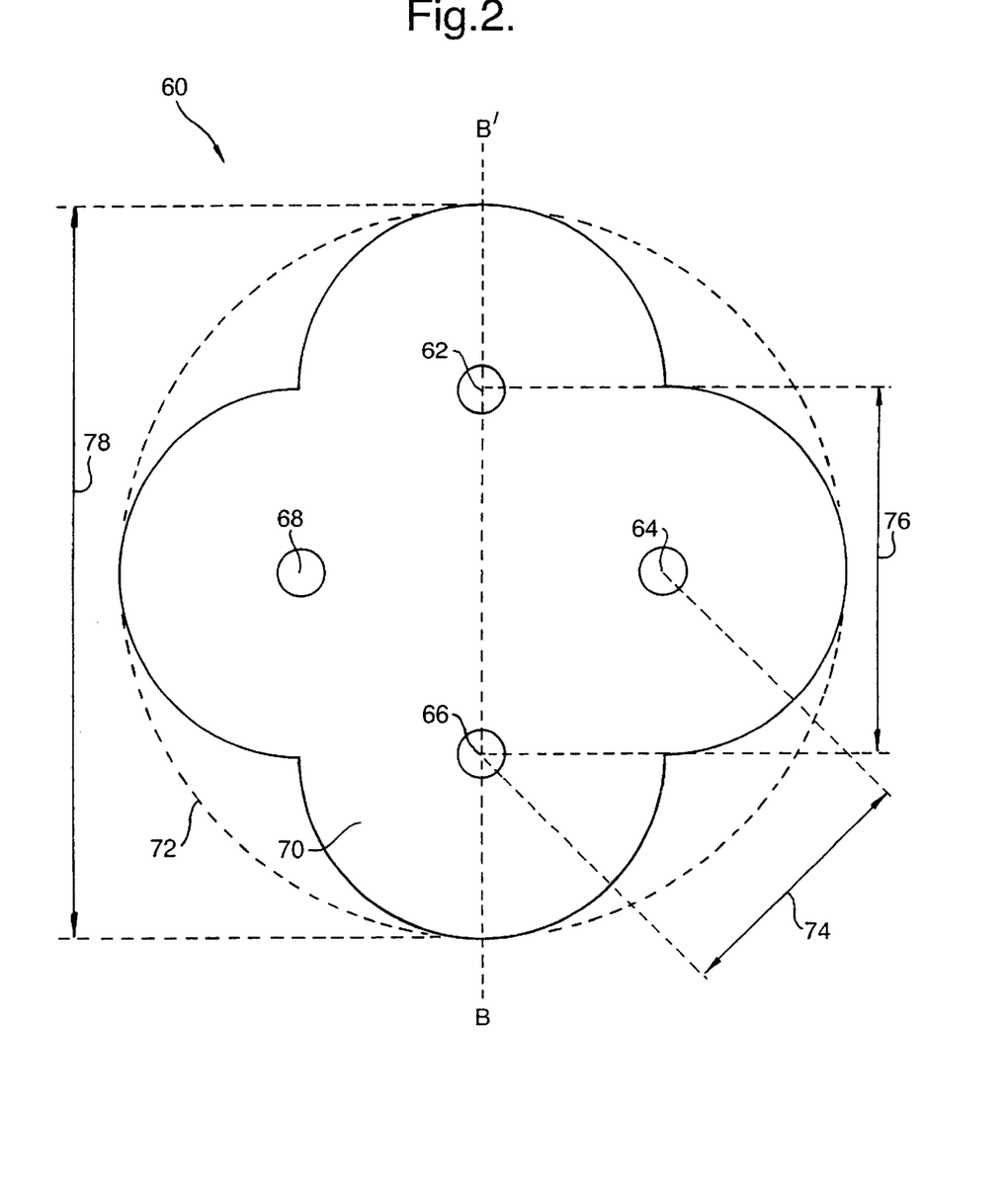
FIG. 2 is a cross section of the BMM fibre optic cable as illustrated in FIG. 1.

A cross section of BMM fibre along AA' of FIG. 1 is illustrated in FIG. 2 and indicated generally by 60. This structure is common to the three sections of BMM fibre, and the description herein is general and not referenced to any particular section. The fibre comprises first and second input 62, 64 and first and second output 66, 68 monomode cores embedded within a lower refractive index cladding 70. A dashed circle 72 with diameter equal to the maximum width of the BMM fibre illustrates the spatial extent of the fibre cross-section. The four cores 62, 64, 66, 68 are symmetrically oriented with nearest-neighbour spacing 74 of 44.2 µm. Opposite input/output core pairs 62, 66 and 64, 68 have an intrapair separation 76 of 62.5 µm. The cladding material is fused silica and core refractive index profiles are defined within by germanium (Ge) doping. Two slightly different levels of Ge dopant are used to form the cores. The input cores 62, 64 therefore have slightly different refractive index profiles in comparison with the output cores 66, 68. The four cores 62, 64, 66, 68 and cladding 70 are in a symmetrical four leaf clover arrangement with maximum diameter 78 of 125 µm. This core arrangement applies to the three fibre sections of the fibre assembly 26. However, when specific reference is made, cores within the first length 30 are referenced with an additional symbol "a", corresponding cores within the sensor downlead 32 are referenced with an additional "b" and those within the sensor length 32 are referenced with an additional "c" e.g. 62c, 64c, etc.

Figure 3:
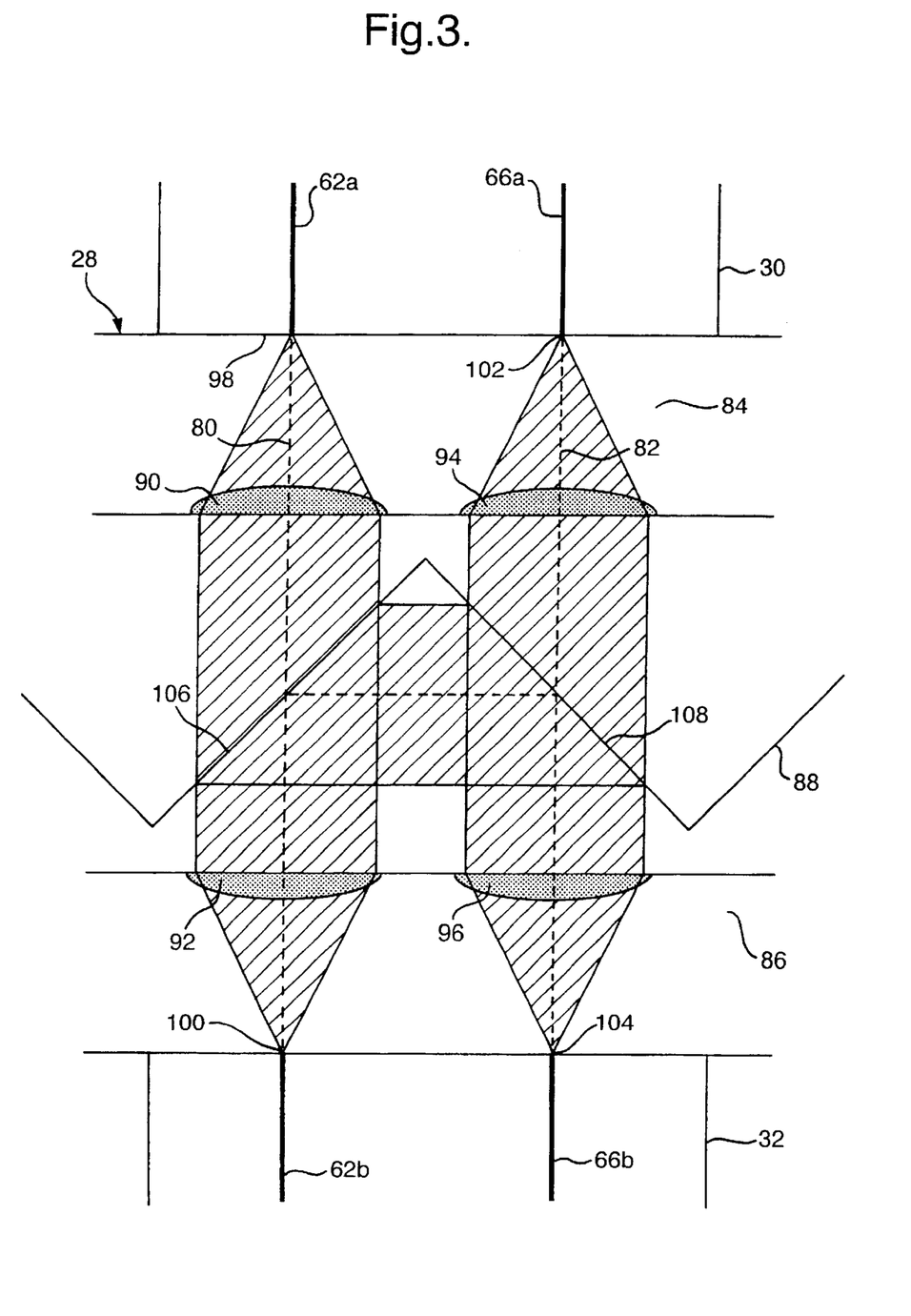
FIG. 3 is a schematic illustration of a tandem coupler as used in the bend sensor.
Figure 5:
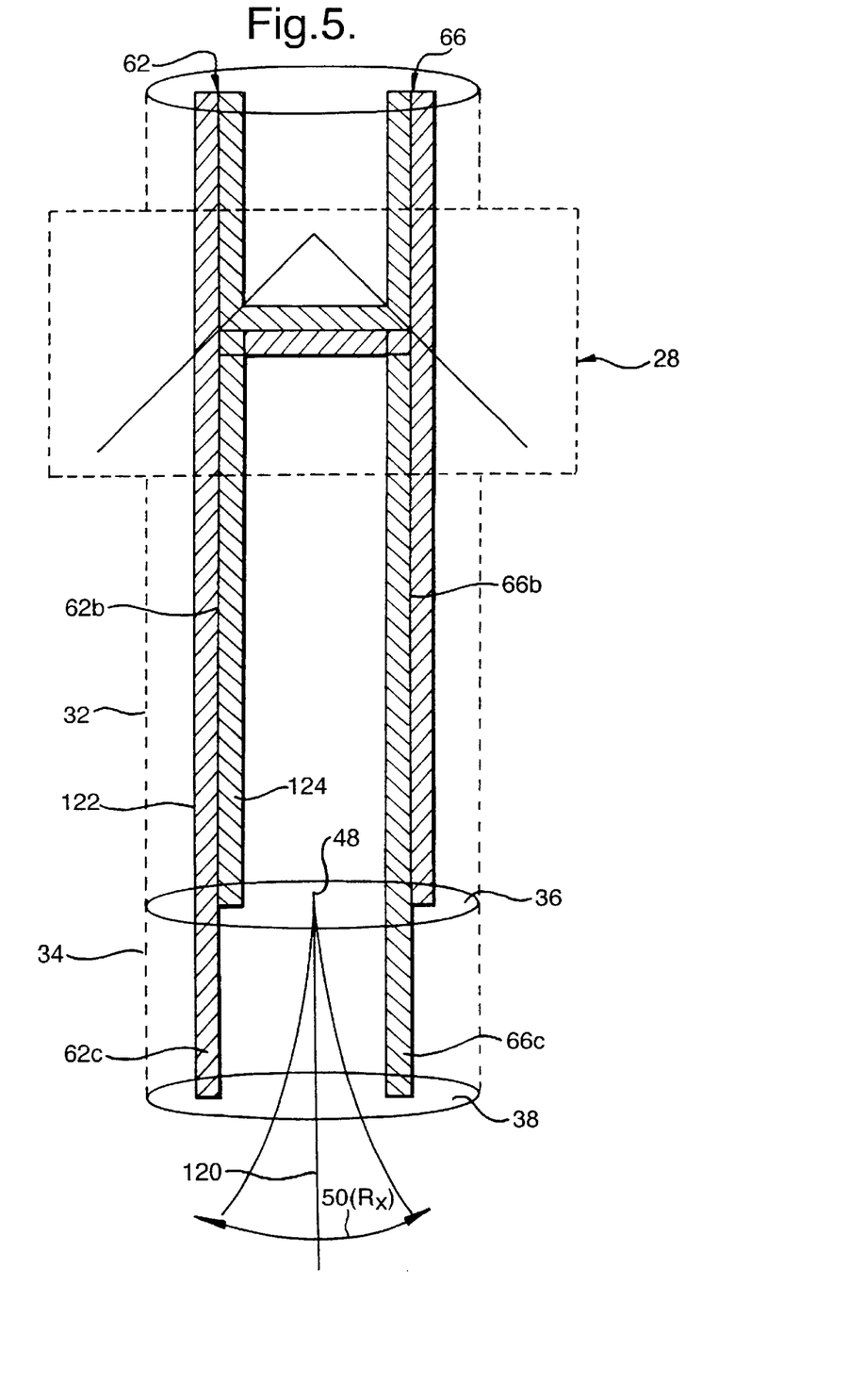
FIG. 5 is a schematic illustration of possible optical paths within the bend sensor.

FIGS. 3 and 5 are both illustrations at various sections of the fibre assembly 26 in a plane containing BB' which passes through one of the two opposite core pairs 62, 66.

FIG. 3 is a view in the plane of the first opposite core pair 62, 66 illustrating the structure of the tandem coupler 28. The core pair 62, 66 comprises input 62 and output 66 cores. The tandem coupler 28 is similarly structured in the plane (not illustrated) of the second core pair 64, 68 and performs the same coupling function with regard to radiation propagating within these cores 64, 68. Components referred to previously are like referenced in this Figure. Specifically the tandem coupler is situated intermediate the first length cores 62a, 64a, 66a, 68a and the sensor downlead cores 62b, 64b, 66b, 68b. Each first length core 62a, 66a shares an optic axis 80, 82 with the corresponding sensor downlead core 62b, 66b. First 80 and second 82 optic axes of respective cores 62, 66 are illustrated in relation to the tandem coupler structure. The tandem coupler 28 comprises first 84 and second 86 Distributed Index Planar MicroLens arrays (DI-PMLs) sandwiching a pyramid beamsplitter 88. The input core optic axis 80 is aligned with first 90 and second 92 microlenses, the first microlens 90 being part of the first DI-PML 84 and the second microlens 92 being part of the second DI-PML 86. Correspondingly, the output core optic axis 82 is aligned with third 94 and fourth 96 microlenses, these again being respective components of the first 84 and second 86 DI-PML. Each microlens 90, 92, 94, 96 is one focal length distant from respective first, second, third and fourth end faces 98, 100, 102, 104 of the cores 62a, 62b, 66a, 66b. The refractive index of the DI-PML substrate material is nominally matched to that of the BMM fibre cores 62, 66. The pyramid beamsplitter 88 has mutually perpendicular first 106 and second 108 semi-reflective plane surfaces aligned at 45° to respective optic axes 80, 82. This orientation of beamsplitter surfaces 106, 108 has particular effect on radiation exiting from the downlead core pair 62b, 66b and incident on the pyramid beamsplitter 88 from the direction of the sensor downlead. A fraction of such radiation is switched into the opposite core within the downlead core pair 62b, 66b and its propagation direction reversed.

Figure 4:
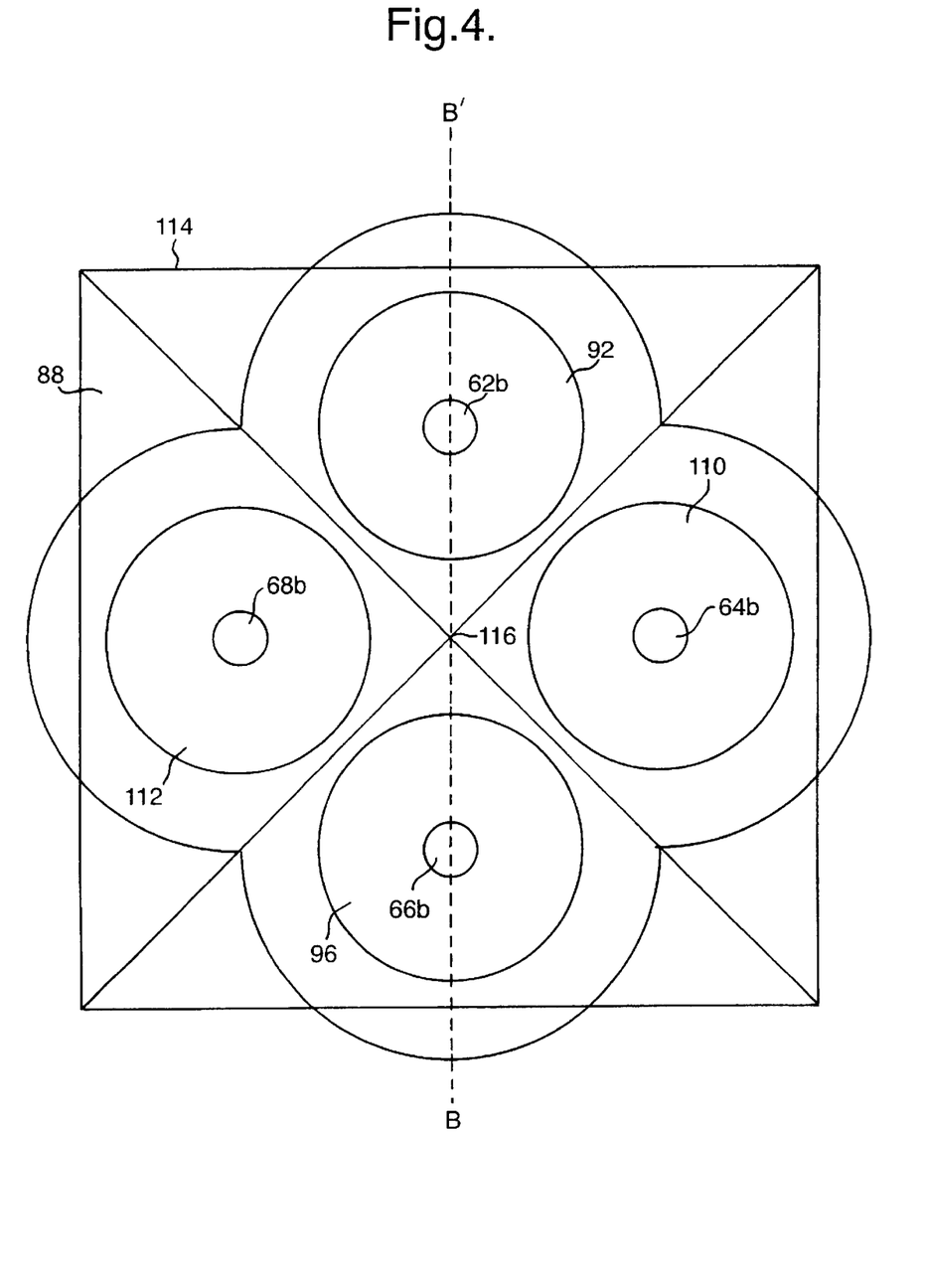
FIG. 4 is a schematic illustration of a pyramid beamsplitter component of the tandem coupler.

FIG. 4 is a schematic illustration of the pyramid beamsplitter 88 viewed through the tandem coupler 28 towards the sensor downlead 32. In this view, sensor downlead cores 62b, 64b, 66b, 68b are surmounted by respective microlenses 92, 110, 96, 112 of diameter 40 µm. The pyramid beamsplitter 88 is sited above these microlenses 92, 110, 96, 112. The beamsplitter 88 is a pyramid structure with square base 114 with sides 108 µm in length and apex 116 sited above at a perpendicular height 54 µm. This defines four planar triangular side faces, each inclined at an angle of 45° to the exit faces of respective cores.

FIG. 5 is a schematic illustration of possible optical paths within the opposite core pair 62, 66 and through intermediate optical components 28, 36. Light propagating within the second core pair 64, 68 follows similarly arranged paths but rotated through an angle of 90° about an in-plane axis along the length of the BMM fibre assembly 26. Components in this Figure which are also illustrated in previously described Figures are referenced as before. Such components include the tandem coupler 28, sensor downlead 32 and length 34, semi-reflective splice 36 and the silvered mirror end 38. A bend axis 120 through the pivot 48 and parallel to the length of the BMM fibre assembly 26 provides a reference axis with respect to which a general bend of the sensor length 34 is defined. A bend is resolved into two components of curvature 50, 52. One component 50 has a radius of curvature $R_x$ and is contained within the plane of the first opposite core pair 62c, 66c. A second component 52 (not illustrated) has a radius of curvature $R_y$ and is contained within the plane of the second opposite core pair 64c, 68c.

Two optical paths within the system are illustrated: a first 122 corresponding to that taken by radiation which is transmitted by the splice 36 while propagating within the input cores 62b, 62c and reflected by the splice while propagating in the output cores 66b, 66c, and a second 124 corresponding to that followed by radiation reflected by the splice 36 in the input cores 62b, 62c and transmitted by it in the output cores 66b, 66c.

Referring once more to FIGS. 1 and 2, the mode of operation of the bend sensor 10 of the invention is as follows. The device 10 is capable of measuring strain at the sensor length 34 which results in a displacement bending of this length 34. Broadband radiation from each SLD 12, 14 is coupled into a respective one of the pair of input monomode optical fibres 16, 18. Radiation propagates within these optical fibres 16, 18 and is coupled by the fan-out connector 24 into two nearest-neighbour cores 62a, 64a of the four core BMM fibre assembly 26. Radiation propagation continues along the first length cores 62a, 64a, through the tandem coupler 28 and then within corresponding nearest-neighbour cores 62b, 64b of the sensor downlead 32 to the semi-reflective splice 36. At the splice 36, a first component of the radiation is transmitted along the sensor length 34 to the silvered mirror 38 coating the fibre end. This component of radiation is then reflected by the mirror 38 and returned through the splice 36 to the tandem coupler 28. A second component of radiation is reflected from the splice 36 directly back along the sensor downlead 32 to the tandem coupler 28. Whilst propagating along this path and in the BMM fibres 30, 32, 34 of the BMM fibre assembly 26, radiation is substantially contained within the input cores 62a,b,c; 64a,b,c. The tandem coupler 28 is arranged to transmit a first fraction of the radiation incident on it from the sensor downlead 32 and reflect a second fraction. The first fraction is transmitted to the first length 30 of the BMM fibre assembly 26, maintaining waveguide core occupancy. That is, radiation within one core 62b, 64b of the sensor downlead 32 is transmitted to the corresponding core 62a, 64a of the first length 30. The second fraction is coupled into the second (output) core 66b, 68b of each respective opposite core pair 62b, 66b; 64b, 68b and reflected back along the sensor downlead 32. This reflected fraction thus executes a second pass through the sensor downlead 32 and sensor length 34 sections of the BMM fibre assembly 26, this time following similarly structured optical paths but confined to different cores. On its subsequent return to the tandem coupler 28, a portion of this reflected fraction is transmitted through the tandem coupler 28, maintaining waveguide core 66, 68 occupancy. This is the fraction of incident radiation which contains information about the various optical path lengths within the cores of the BMM fibre assembly 26 which are of interest to this invention. A detailed description of the information contained and its extraction by interferometry will be provided later. Radiation propagating from the tandem coupler 28 in the output cores 66a, 68a of the BMM fibre assembly 26 is coupled by the fan-out connector 24 into respective output monomode fibres 20, 22. Radiation output from each monomode fibre 20, 22 is analysed by a respective fibre optic linked spectrometer 27a, 27b.

The internal structure of the BMM fibre components of the assembly 26 is illustrated in FIG. 2. Core separation 74 and dimensions, and cladding dimensions 76 are such as to avoid significant crosstalk between radiation propagating in each core 62, 64, 66, 68 and yet maintain an acceptably small fibre diameter 78 overall. An external diameter of 125 μm lends itself to a number of applications in which the disturbance caused by sensor intrusion should be minimised.

Referring now to FIG. 3, the operation of the tandem coupler 28 is as follows. This description refers only to radiation propagating within the first opposite core pair 62, 66. Radiation also propagates in the second opposite core pair 64, 68 in a symmetrically equivalent arrangement. However there is minimal interaction of radiation between the two pairs and for reasons of brevity only the first core pair 62, 66 is referred to. Nonetheless, the complete embodiment of this invention does include a symmetrically equivalent arrangement in a plane perpendicular to that of the first core pair 62, 66 parallel to the BMM fibre axis.

Radiation propagating in input core 62 is reflected from the splice 36 and/or the mirrored end 38 and directed back along the sensor downlead 32 towards the tandem coupler 28. This radiation is substantially contained within one core 62b of the opposite pair 62b, 66b and is incident on the tandem coupler 28 at the fibre end face 100. Radiations collimated by the second microlens 92 of the second DI-PML 86 and directed toward the first semi-reflective plane surface 106 of the pyramid beamsplitter 88. Core component of this radiation is transmitted to the first microlens 90 of the first DI-PML 84 and the second component is reflected towards the second semi-reflective plar surface 108 of the pyramid beamsplitter 88. At this second surface 108 reflection and transmission again occur and a component of the propagating radiation is reflected towards the fourth microlens 96 of the second DI-PML 86. This component is then focused by the fourth microlens 96 and coupled into the opposite core 66b at its end face 104 to propagate back along the sensor downlead 32. Correspondingly, radiation propagating from the sensor downlead 32 in the output core 66b of the core pair will be partially transmitted to the corresponding core 66a in the first length 30 and partially reflected back along the sensor downlead 32 confined in the input core 62b. Radiation traversing the tandem coupler 28 in a direction from the first length 30 to the sensor downlead 32 will be partially transmitted, maintaining core occupancy. Other components are lost from the system. Thus the overall function of the tandem coupler 28 is equivalent to that of a (lossy) semi-reflective surface with a transmission coefficient $\tau^{tc}$ and unidirectional reflection coefficient $\rho_{tc}$, with the additional property that reflection results not only in propagation direction reversal but also in a switch in confinement between the cores of an opposite core pair 62b, 66b. If the transmission and reflection coefficients of each surface plane 106, 108 of the beamsplitter pyramid are $\tau_p$ and $\rho_p$ respectively, then $\tau_{tc}=\tau_p$ and $\rho_{tc}=\rho_p^2$ or 0, depending on direction of propagation.

Referring to FIG. 5, the principle behind the operation of this invention is outlined. As before, the description is limited only to propagation along the first opposite core pair 62, 66 although symmetrical optical paths are followed in a perpendicular plane. Radiation enters the system propagating along the first length 30 within the input core 62a of the first opposite core pair 62a, 66a. It is transmitted through the tandem coupler 28, propagates along the sensor downlead 32 in input core 62b to the splice 36. There are two optical paths 122, 124 through the system containing information pertinent to this invention and they diverge at this point. The first optical path 122 is that followed by radiation transmitted by the splice 36. This component propagates in input core 62c to the mirrored end 38 where it is reflected and propagates back to the splice 36. The second optical path 124 is that followed by radiation reflected when first incident on the splice 36. Both components therefore propagate from the splice 36 back along the sensor downlead 32 in input core 62b again following a common path. On reaching the tandem coupler 28, both components are reflected and coupled into the output core 66b of the core pair 62b, 66b. Still following a common path, the components propagate for a third time along the sensor downlead 32, on this occasion confined to a different core 66b, 66c. At the splice 36 the optical paths 122, 124 again diverge. In this core 66b, 66c, the first optical path 122 is followed by radiation reflected at the splice 36 and the second optical path 124 is followed by transmitted radiation. The component of radiation following this second optical path 124 is reflected by the mirrored end 38 and returned to the splice 36. Propagating from the splice 36, back towards the tandem coupler 28 the components again follow a common path. They are both transmitted by the tandem coupler 28 and exit the system confined in the output core 66a. Radiation output from the system in this core 66a is subject to interferometric analysis by the fibre optic linked spectrometer 27a. The difference therefore between these two optical paths 122, 124 is that the first 122 requires two passes of the sensor length 34 in the input core 62c and the second 124 requires these passes to be made in the output core 66c. A bending of the sensor length 34 inevitably results in a lengthening of one core with respect to the other of the pair 62c, 66c. The features of an interference pattern generated from radiation following the first optical path 122 and radiation following the second optical path 124 is dependent on the optical path difference (OPD) between the two paths 122, 124. The OPD arises almost entirely from the different physical path lengths in the two separated cores 62c, 66c in the bent sensor length 34. This OPD is therefore indicative of the degree of bending of the sensor length 34 in the plane of the opposite core pair 62c, 66c. Two perpendicular components of a sensor length bend are measured in this embodiment of the invention one in each plane defined by an opposite core pair. From this data the degree and orientation of the bend is deduced. Because the refractive index of the input core 62c is slightly different from that of the output core 66c, the OPD is dependent on the direction of a bend i.e. whether the input core 62c is compressed or stressed with respect to output core 66c. Thus bend handedness is also measured by this invention.

Figure 6:
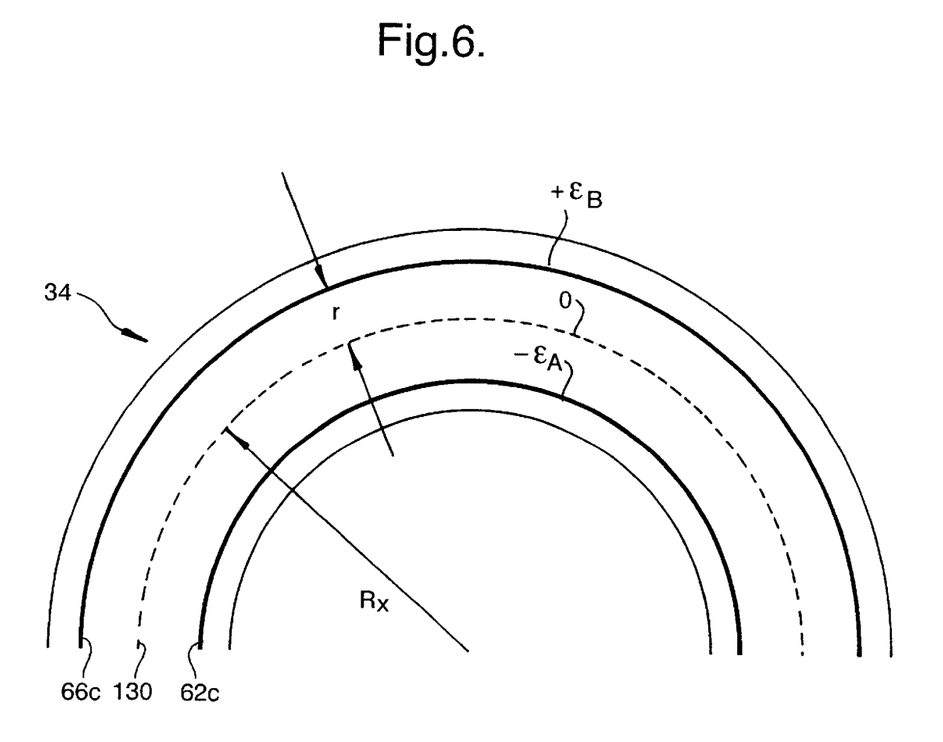
FIG. 6 is an illustration of a hypothetical bend in the sensing length of the bend sensor.

FIG. 6 is a representation of the effect of bending the sensor length 34. Bending is illustrated as being in the plane of FIG. 5 i.e. this Figure is a section through the sensor length 34 in the plane of the first opposite core pair 62c, 66c. The bend is described in terms of its radius of curvature $R_x$. In bending, a central axis 130 of the sensor length 34 provides a reference length ($L_s$) and a reference strain which is taken to be zero. Relative to this, in the specific bend illustrated, the input core 62c is compressed and experiences a strain of $-\epsilon_A$ and the output core 66c is stretched to a strain $+\epsilon_B$. The cores 62c, 66c are located a distance r from the central axis 130.

Referring to FIGS. 2 and 6, the effect of a general bend of a multicore optical fibre is detailed below. Symmetrically distributed waveguide cores will be either compressed or stretched longitudinally as one side of the fibre is lengthened with respect to the other. This general distortion can be resolved into components consistent with the symmetry of the core distribution. In this embodiment a four-core fibre is used and appropriate bend components are those in the two planes containing opposite core pairs. FIG. 6 is an illustration of the component in the plane of a cross-section taken along BB' in FIG. 2. Optical elements within the fibre assembly are arranged such that radiation propagating in one core 62, 64 of each component plane is coupled into the other core 66, 68 within that same component plane. In this way any optical path difference between the two cores 62, 66 arising from a general fibre bend is evidenced in an interference pattern formed from radiation components traversing different paths. This interference pattern is used to extract the sensor length bend component within the plane defined by the coupled cores. Defining the component planes by well-separated cores is advantageous because of the increased optical path length differential resulting from a bend.

The sensor length bend component in the plane defined by coupled cores 62, 66 has general radius of curvature $R_x$. The central axis 130 of the sensor length 34 provides a reference length and strain of zero relative to which the strain at each core is measured. In this embodiment of the invention any tensile strain and resultant change in the overall fibre sensor length $L_s$ is not detected. Changing $L_s$ will affect both optical paths 122, 124 equally and, although therefore this parameter is not constant, its variation is irrelevant to the analysis below.

One skilled in the art will appreciate that longitudinal strain may be measured by a prior art technique, if required, although it is not necessary for many applications envisaged. Furthermore prior art techniques such as patent application PCT/GB94/01388 to measure longitudinal strain require interrogation of a sensor length against an external reference. It is an advantage of this invention that an external reference is not needed either to provide a complementary path difference or to facilitate scanning of an optical path difference, which cannot be achieved within the sensor length. Once an external reference is incorporated, it is a simple extension of a prior art technique to interrogate each core of a multicore fibre independently, derive values of longitudinal strain at each core and thereby determine bend magnitude and orientation. It is to be appreciated that, as already part of the prior art, longitudinal strain measurement is not central to the inventive concept behind this invention and will be omitted from this description for clarity.

The strain ($\epsilon_B$), defined as the ratio of elongation to unstrained length, experienced by the output core 66c is thus:

$$\epsilon_B = \frac{(R_x + r)\alpha - R_x\alpha}{R_x\alpha} = \frac{r}{R_x} = r\kappa_x$$

where $\alpha$ is the angle subtended by the sensor length bend and $\kappa_x = 1/R_x$ is the bend curvature. Similarly the strain ($\epsilon_A$) experienced by the input core 62c is $$\epsilon_A = -\frac{r}{R_x} = -r\kappa_x$$

Strain and temperature affect both the length (L) and the effective refractive index ($\eta$) of a waveguide core. However, in this invention the cores are sufficiently close that, in all except large transverse thermal gradients, they effectively experience the same environmental temperature. Thus any optical path difference which is measured by interference techniques can, to a good approximation, be attributed purely to the effect of strain. In general $L = L_s(1+\epsilon)$, and $\eta = \eta_0 + \eta_\epsilon$ where $\eta_0$ and $L_s$ are the effective refractive index and length respectively of the unstrained waveguide sensor length 34 at its environmental temperature and $\eta_\epsilon$ is the contribution to effective refractive index arising from strain $\epsilon$. The effective refractive index in a strained environment is, more informatively:

$$\eta_{core}(\lambda, \epsilon) = \eta_{core}(\lambda) - \epsilon K \eta_{core}^3(\lambda)$$

where the subscript $_{core}$ has been included to indicate explicitly that η refers to the effective refractive index experienced by monomode propagation within a waveguide core, and the dependence of these effective refractive indices on wavelength λ has also been indicated. The parameter K is a strain-optic coefficient which is given by $$K = \frac{1}{2}\{(1-\mu)p_{12} - \mu p_{11}\} \cong 0.103 \text{ (for fused silica)}$$

where $p_{11}$, $p_{12}$ are Pockels coefficients and $\mu$ is Poisson's ratio. Both length and refractive index changes affect the phase ($\phi_{core}$) of radiation within the core:

$$\phi_{core} = \frac{4\pi}{\lambda} L(\varepsilon) \eta_{core}(\lambda, \varepsilon) \quad (1)$$

$$= \frac{4\pi}{\lambda} L_s (1 + \varepsilon_{core})[\eta_{core}(\lambda) - \varepsilon_{core} K \eta_{core}^3(\lambda)]$$

Equation (1) therefore describes mathematically the phase of radiation as it propagates within a monomode waveguide core. A detailed description of the extraction of phase information, and hence strain, from an interference pattern generated by this invention is given below with reference to FIG. 5. Also presented are further details of apparatus design.

Radiation input to the system and propagating down first input core 62 can be represented at time t by the analytic signal $$E(\omega, x) = E_0 e^{i(\phi_0 + \phi(\omega, z))} e^{i\omega t}$$

where E is the radiation instantaneous electric field, ω the angular frequency, z the distance travelled along the guide core, $\phi_0$ the initial phase and $\phi$ the phase variation with distance. In particular $$\phi = \frac{\omega}{c} \times OPL = \frac{\omega}{c} z \eta_{core}(\omega)$$

where OPL is the optical path length traversed, $\eta_{core}$ the effective refractive index of the fibre core and c the speed of light.

Radiation transmitted for a first time through the tandem coupler 28 propagates along the first input core 62b to the splice 36 where it is split into two components. The first component (indicated by subscript T), following the first optical path 122, is transmitted by the splice 36 and then reflected at the mirrored end 38. The second component (indicated by subscript R), following the second optical path 124, is simply reflected. The splice 36 transmits and reflects incident radiation with transmission and reflection coefficients $\tau_s$ and $\rho_s$ respectively and the mirrored end 38 reflects with reflection coefficient $\rho_m$. For convenience in describing the theory of the invention any phase change experienced by all radiation components as a result of traversing a common path will be referred to generically as $\phi_{cp}$. Thus the two components which are reflected back along the input core 62b towards a second passage through the tandem coupler 28 are represented by the signals:

$$E_R = \rho_s \tau_{tc} E_0 e^{i\phi_{cp}}$$

$$E_T = \rho_s^2 \rho_m \tau_{tc} E_0 e^{i\phi_{cp}} e^{i\phi_A}$$

where, for reasons of clarity, the common time-dependent term $e^{i\omega}$ is not shown and initial phase $\phi_0$ has been incorporated into $\phi_{cp}$. The factor of $\tau_{tc}$ arises from the first pass through the tandem coupler 28. The phase $\phi_A$ is the additional phase change developed in the transmitted component due to the optical path length associated with two passages (one in each direction) through the sensor length 34 in the input core 62c. This optical path length is given by $2L_{s62}\eta_{core62}$.

On reaching the tandem coupler 28, the radiation components of interest to this invention are those which are then reflected into the output core 66b, experiencing a reflection coefficient $\rho_{tc}$. Following two optical paths 122, 124 these components propagate to and are incident on the splice 36 for the first time in the output core 66b. At this point, each component is split into a further two components: one (R) is simply reflected by the splice 36; the other (T) is transmitted by the splice 36, reflected by the mirrored end 38 and then again transmitted through the splice 36. On the second return along the sensor downlead 32 to the tandem coupler 28 there are thus four distinct components of radiation:

$$E_{RR} = \rho_{tc} \rho_s^2 \tau_{tc} E_0 e^{i\phi_{cp}}$$

$$E_{TR} = \rho_{tc} \rho_s \tau_s^2 \rho_m \tau_{tc} E_0 e^{i\phi_{cp}} e^{i\phi_A}$$

$$E_{RT} = \rho_{tc} \tau_s^2 \rho_m \rho_s \tau_{tc} E_0 e^{i\phi_{cp}} e^{i\phi_B}$$

$$E_{TT} = \rho_{tc} \tau_s^4 \rho_m^2 \tau_{tc} E_0 e^{i\phi_{cp}} e^{i\phi_A} e^{i\phi_B}$$

where $\phi_B$ is the phase difference introduced by traversal of the optical path between the splice 36 and mirrored end 38 within the output core 66c. Since two passages of the sensor length 34 are made, this optical path length is given by $2L_{s66}\eta_{core66}$.

Thus when output from the system, after a final traverse of the tandem coupler 28, the total output signal can be represented by a supposition of four fields:

$$E_{out} = \tau_{tc}^2 \rho_{tc} E_0 e^{i(\phi_0 + \phi_{cp})} e^{kvt} \{\rho_s^2 + \rho_s \rho_m \tau_s^2 e^{i\phi_A} + \rho_s \rho_m \tau_s^2 e^{i\phi_B} + \rho_m^2 \tau_s^4 e^{i(\phi_A + \phi_B)}\} \quad (2)$$

This signal is input to the fibre optic linked spectrometer 27a. Information concerning the bend of the sensor length, as described in Equation (1), is contained within the phases of the four components of Equation (2). This is extracted using interference techniques. Formation of a coherent interference pattern is governed by the mutual phase difference between the four components and their subsequent detection optical bandwidth. This embodiment of the invention is arranged such that the effective coherence length on detection is less than twice the sensor length ($L_s$) but greater than the largest difference in optical path length at the extremity of bend curvature. In this way the first ($\rho_s^2$) and fourth ($\rho_m^2 \tau_s^4 e^{i(\phi_A + \phi_B)}$) components of Equation (2) do not interfere with any other component and the second ($\rho_s \rho_m \tau_s^2 e^{i\phi_A}$) and third ($\rho_s \rho_m \tau_s^2 e^{i\phi_B}$) components interfere on detection throughout a full range of practical bend curvatures.

The fibre optic linked spectrometer 27a incorporates an array of pixel detector elements. The coherence length ($I_{ci}$) of radiation incident on the ith pixel is given by $$I_{ci} \approx \frac{c}{\Delta v_i} \approx \frac{\lambda_{0i}^2}{\Delta \lambda_i}$$

where $\lambda_{0i}$ is the central wavelength of detection, $\Delta\lambda_i$ the detected optical bandwidth and $\Delta v_i$ the frequency spread of the detected signal. To satisfy the interference requirements above, the restriction on optical bandwidth per pixel of the detector array is subject to the condition:

$$2|OPL_{SA} - OPL_{SB}|_{max} < I_{ci} < 2\{OPL_{SA} = OPL_{SB}\} \quad (3)$$

where OPL is the optical path length and subscripts SA and SB refer to propagation through the sensor length 34 in input 62c and output 66c cores respectively. In the embodiment herein described, this condition is satisfied by the commercially available Ocean Optics PC1000 fibre-linked spectrometer.

Only one interference pattern is generated in an embodiment of the invention which satisfies the condition of Equation (3) above. The intensity pattern across such an interferogram is represented by:

$$I_{out} = \tau_{tc}^4 \rho_{tc}^2 I_0 |e^{i(\phi_0 + \phi_\infty)} e^{i\omega t}|^2 \{\rho_s^4 + \rho_m^4 \tau_s^8 + \rho_s^2 \rho_m^2 \tau_s^4 | e^{i\phi_A} + e^{i\phi_B} |^2\}$$

This can be written in terms of the transmittance ($T=\tau^2$) and reflectance ($R=\rho^2$) of the splice 36 and mirrored end 38:

$$I_{out} = T_{tc}^2 R_{tc} I_0 \{R_s^2 + R_m^2 T_s^4 + 2 R_s R_m T_s^2 [1 + \cos(\phi_A - \phi_B)]\}$$

The R and T values of the splice 36 and mirrored end 38 in the embodiment described are $R_s = 1/3$, $T_s = 2/3$ and $R_m = 1$. These values maximise the depth of the $[1 + \cos(\phi_A - \phi_B)]$ modulation. In this embodiment therefore, the interferogram intensity variation is given by $$I_{out} \approx 2.05 + \cos \Phi$$

where $\Phi = \phi_A - \phi_B$.

Substituting Equation (1) for the values of $\phi_A$ and $\phi_B$, the effect of fibre bending on $\Phi$ can be written:

$$\Phi(\lambda) = \frac{4\pi}{\lambda} L_s \{(1 + \varepsilon_A)(\eta_A(\lambda) - \varepsilon_A K \eta_A^3(\lambda)) -$$
$$(1 + \varepsilon_B)(\eta_B(\lambda) - \varepsilon_B K \eta_B^3(\lambda))\}$$
$$= \frac{4\pi}{\lambda} L_s \{(\eta_A(\lambda) - \eta_B(\lambda)) + \varepsilon_A (\eta_A(\lambda) - K \eta_A^3(\lambda)) -$$
$$\varepsilon_B (\eta_B(\lambda) - K \eta_B^3(\lambda)) - K(\varepsilon_A^3 \eta_A^3(\lambda) - \varepsilon_B^2 \eta_B^3(\lambda))\}$$

Second order terms in $\epsilon$ are at least four orders of magnitude less than first order terms and, to a very good approximation, can be neglected. The resultant phase difference arising from a bend curvature $\kappa$ is thus:

$$\Phi(L_s, \kappa, \lambda) = \frac{4\pi}{\lambda} L_s \{(\eta_A(\lambda) - \eta_B(\lambda)) -$$
$$r\kappa_x [(\eta_A(\lambda) + \eta_B(\lambda)) - K(\eta_Z^3(\lambda) + \eta_B^3(\lambda))]\} \quad (4)$$

and the generated interferogram has intensity variation $$I_{out}(L_s, \kappa, \lambda) \approx 2.05 + \cos \Phi(L_s, \kappa, \lambda)$$

The slightly different doping levels in the input 62c and output 66c cores enables the direction of bend curvature within this plane, i.e. whether input core 62c is compressed or extended, to be determined. Different doping levels ensure that $\eta_A(\lambda) \neq \eta_B(\lambda)$, $\Phi(L_s, \kappa, \lambda) \neq -\Phi(L_s, -\kappa, \lambda)$ and so $I_{out}(L_s, \kappa, \lambda) \neq I_{out}(L_s, -\kappa, \lambda)$. If $\eta_A > \eta_s$, a positive curvature ($\kappa$) will result in an expanded fringe system in comparison with a negative curvature. The system 10 is calibrated initially over a range of both positive and negative bend curvatures and it may become apparent at this stage that the frequency ranges of cosine fringes in the two regimes do not overlap.

The superluminescent diodes 12, 14 inject broadband radiation into the system 10 and broadband interferograms are generated. These interferograms are detected using the fibre optic linked spectrometers 27a, 27b. In the plane defined by core pair 62, 66, radiation output from the end of the BMM fibre assembly 26 is dispersed and focused by the spectrometer 27a onto a linear detector array as a channelled spectrum. In this way one point (constant optical path difference) of the interferogram is sampled over a range of wavelengths. Another sampling technique which provides alternative embodiments of the invention derives from scanning the sensor length $L_s$. However scanning sensor length presents additional considerations which may not be acceptable in some applications. Practically it is not possible to change the length of the sensor length 34, as used in the specific embodiment employing wavelength scanning. An additional optical path element of variable length, such as that provided by a Michelson interferometer, must be included in the system as an external compensation for the optical path difference introduced by the bend. Interferograms may be produced either spatially or temporally. Spatial multiplexing of an interferogram allows for the possibility of fringe tracking. This involves continuous monitoring of a portion of the interferogram the motion of which is attributable to changes in the bend curvature of a sensing element. This constitutes a convenient monitoring technique which presents readily interpretable results, without the need for complex signal processing.

In the specific embodiment presented herein, the interferogram is sampled as a function of $\lambda$ by the spectrometer 27a. The sampling is discrete (at the position of each pixel of the detector) and results in a series of interferogram intensities measured at each pixel position. The detector has substantially identical pixels whose positions in the array increment linearly with wavelength. The measured channelled spectrum function is termed $I(p_i)$ where $p_i$ represents the position of the ith pixel. A Fourier transform of this function is calculated to give the function $I(q_i)$, where $q_i$ represents inverse pixel position (spatial frequency). Noise within the system appears at the high frequency end of this $I(q_i)$ spectrum. DC background bias and source spectral profile give rise to a large peaks at the low frequency end. A bandpass filter is therefore applied to $I(q_i)$ to select an intermediate range which contains usable information $I(q_i)$. An analytical representation of the interferogram is then derived from $I(q_i)$ by taking the inverse Fourier transform to $Re [I'(p_i)]$, the real part of the representation, and then the Hilbert transform of this to $Im [I'(p_i)]$, the imaginary part. The analytical representation is thus:

$$I(p_i) = Re[I'(p_i)] + i \times Im[I'(p_i)] = A(p_i) e^{i\phi(p_i)}$$

For each component sampled along the detector array a value of $\phi(p_i)$ is calculated from the argument of the analytic signal $I'(p_i)$. The phase is unwrapped to remove $2\pi$ discontinuities and a series of phase values across pixel positions are obtained. In this embodiment of the invention the wavelength variation across the broadband source output is approximately from 810 nm to 840 nm i.e. ~3.64%. The inverse wavelength range is therefore to a first order approximation, also broadly linear and no significant error will arise in taking pixel position to represent inverse wavelength. In fact this error is reduced still further by the bandpass filter which removes higher order components of the expansion. Thus unwrapped phase variation with inverse wavelength is effectively obtained by this signal processing technique. This phase variation can then be fitted to a polynomial. For the purpose of bend curvature a first order least-squares fit will generally be sufficient.

The bend curvature ($\kappa_x$) may be extracted from the phase variation with inverse wavelength using Equation (4) above. The other parameters of Equation (4): $\eta_A(\lambda), \eta_B(\lambda), r, K$, and $L_s$ can be used directly if their values are known but generally it will be more accurate to allow for system errors and irregularities and pre-calibrate the measurements for a range of known bend curvatures.

By an analogous route the value of $\kappa_y$ is extracted from interferomettic measurement of radiation input to and output from the second opposite core pair 64, 68. Together measurement of the magnitude and direction of both $\kappa_y$ and $\kappa_x$ provides the information necessary to deduce total bend curvature and orientation.

Further information than solely bend curvature may be extracted from the phase variation with inverse wavelength if a higher order polynomial fit is made. For example, the second order coefficient may be used to discriminate between temperature variation and strain as known in the prior art and described in patent application PCT/GB94/01388.

It is not necessary to use a 4-core BMM fibre in the assembly 26. The fibre may contain any arrangement of core pairs which enables bend components to be measured in each core-pair plane. Neither is it necessary to have a symmetrical arrangement of cores. An alternative embodiment of the invention provides for a 6-core photonic crystal fibre to replace the BMM fibre 26. Such fibres are manufactured by close packing of cylindrical units and therefore have 6-fold symmetry at the fibre entry/exit faces. Multiple cores are defined by fabricating waveguides at appropriately positioned cylindrical units. Waveguide core positions must be well separated to reduce crosstalk and well cladded. In a 6-core symmetric embodiment components of bend curvature are measured in three planes of opposite core pairs. Three bend components provide for more accurate measurement of vector strain. In a 3-core embodiment three core-pairs in three planes are again available but cores must provide for simultaneous operation as both input and output cores or application is limited to bends which vary slowly with time.

Photonic fibres allow for waveguide cores to be more closely spaced before cross-coupling effects occur in comparison with the BMM fibres described herein. This allows the overall diameter of the fibre to be reduced, lowering further the disruption caused by sensor intrusion.

The embodiment described illustrates an application of the invention to strain measurement. However, as noted above, temperature has a similar effect to strain on light propagating within a fibre. These multicored fibres can thus be used, in an analogous fashion, to measure temperature gradient. Such a measurement assumes that the optical path difference between two cores of a pair arises entirely from the temperature difference in the environments of each core. Note that as the cores in both BMM fibres and photonic crystals are very closely spaced, these fibres are primarily applicable to measurement of large temperature gradients.

Another adaptation provides capability for simultaneous measurement of bend and temperature. In this embodiment, the cores of the BMM fibre exhibit high, stress-induced birefringence (HiBi cores). This provides a means, as described in patent application GB9606785.5, for sensitive discrimination between the effects of strain and temperature on fibre optical properties. A change in temperature modifies induced stresses in a HiBi core and so affects its birefringence. However, high birefringence shields the core from transverse stresses and so is substantially unaffected by stress. Thus both bending and temperature modify the length of the cores whereas only temperature affects the birefringence. Determination of these unequally-affected parameters allows discrimination between the effects of temperature and strain. The optical configuration and interrogation schemes are unchanged from those illustrated in FIG. 1. Radiation is coupled into the HiBi cores in such a way as to equally populate both polarisation eigenmodes. Each physical optical path 122, 124 with a HiBi core pair is resolved into two optical paths, a "fast" and a "slow" channel, each populated by one eigenmode. Two interferograms are therefore generated for each measurement, and are analysed in known manner to separate the contributions of temperature and strain.

What is claimed is:

1. A bend sensor comprising:
    a fibre assembly including a multicore optical fibre having component cores sufficiently separated to counteract crosstalk and a sensor length section;
    coupling means for coupling radiation propagating in a first core of said component cores into a second core of the component cores of the fibre assembly;
    reflecting means for reflecting a portion of incident radiation, said reflecting means and said coupling means arranged such as to define a first optical path corresponding to radiation propagating within said first core and a second optical path corresponding to radiation propagating within said second core, wherein said paths have an optical path difference over said sensor length section; and
    analysing means for analysing radiation output from the fibre assembly and developing and spectrally dispersing interferograms formed between the radiation propagating in the first and second optical paths and for providing a fibre curvature output determined from phase variations in said interferograms.

2. A bend sensor according to claim 1, wherein the first and second cores constitute a core pair and component cores of the multicore fibre comprise an arrangement of such core pairs; and the coupling means is arranged to couple and reflect a portion of radiation propagating in the first core into the second core of the respective core pair.

3. A bend sensor according to claim 1, wherein the sensor further includes signal processing means arranged to extract interferogram phase variation from the dispersed interferograms and to calculate bend curvature ($\kappa$) of the sensor length section from the phase variation.

4. A bend sensor according to claim 3 wherein interferograms are generated from radiation propagating within within the first and second cores which constitute a core pair, each interferogram arising from differences in the first and second optical path lengths; and the bend curvature ($\kappa$). is comprised of two components of bend curvature ($\kappa_x$, $\kappa_y$) in a plane containing the sensor length section respective core pair.

5. A bend sensor according to claim 4, wherein the multicore optical fibre comprises at least two core pairs contained in non-coincident planes, thereby enabling calculation of absolute bend magnitude and orientation from corresponding components of bend curvature.

6. A bend sensor according to claim 5 the multicore optical fibre comprises two core pairs contained in orthogonal planes.

7. A bend sensor according to claim 5, wherein the component cores within each core pair have unequal effective refractive indices.

8. A bend sensor according to claim 1, wherein the multicore optical fibre is a bunched multiple monomode (BMM) fibre.

9. A bend sensor according to claim 1, wherein the component cores are stress-induced highly birefringent (HiBi) cores.

10. A bend sensor according to claim 1, wherein the multicore optical fibre is a photonic crystal fibre.

11. A bend sensor according to claim 1, wherein the fibre assembly is arranged to receive broadband radiation and the analysing means is arranged to form a channelled spectrum by developing and spectrally dispersing interferograms formed between radiation propagating in the first and second optical paths.

12. A bend sensor according to claim 11, wherein broadband radiation propagating within the multicore optical fibre is provided by a superluminescent diode.

13. A bend sensor according to claim 11, wherein broadband radiation propagating within the multicore optical fibre is provided by an Erbium Doped Fibre Amplifier.

14. A bend sensor according to claim 11, wherein broadband radiation propagating within the multicore optical fibre (30, 32, 34) is provided by a Praseodymium light source.

15. A bend sensor according to claim 1, wherein the analysing means comprises a scanning interferometer arranged to perform a scan of said optical path lengths and whereby interferometer optical path differences compensate for the optical path difference between first and second optical paths and the analysing means is arranged to develop interferograms formed between radiation propagating in the first and second optical paths and spectrally disperse such interferograms as a function of the interferometer scan.

16. A bend sensor according to claim 15, wherein the scanning interferometer is arranged to perform a spatial scan.

17. A bend sensor according to claim 15, wherein the scanning interferometer is arranged to perform a temporal scan.

18. A bend sensor according to claim 1, wherein the component cores are distributed in a symmetrical arrangement within the multicore optical fibre.

19. A bend sensor according to claim, 1, wherein the multicore optical fibre is less than 130 µm in diameter.

20. A bend sensor according to claim 1, wherein the coupling means is a tandem coupler.

21. A bend sensor according to claim 20, wherein the tandem coupler incorporates a beamsplitter wherein the beamsplitter comprises a base and, non-coplanar with this, respective pairs of planar surface faces for each core pair wherein each planar surface face extends from the base towards an apex and faces within each pair are mutually disposed at approximate right angles.

22. A bend sensor according to claim 21, wherein the multicore optical fibre has four symmetrically oriented component cores and the beamsplitter comprises a square base, four triangular surface faces and an apex wherein each triangular face extends from one side of the square base to the apex and the perpendicular distance from the apex to the base is one half of the distance of one side of the base.

23. A bend sensor according to claim 21, wherein within the tandem coupler the beamsplitter is located intermediate to first and second planar microlens arrays wherein each microlens array includes a respective microlens located a focal distance away from each component core and wherein the microlenses of each array are arranged in a common plane and the common planes of each lens array are mutually parallel and parallel to the base of the beamsplitter.

24. A temperature sensor comprising:
a fibre assembly including a multicore optical fibre having component cores sufficiently separated to counteract crosstalk and a sensor length section;
coupling means for coupling radiation propagating in a first core of said component cores into a second core of the component cores of the fibre assembly;
reflecting means for reflecting a portion of incident radiation, said reflecting means and said coupling means arranged such as to define a first optical path corresponding to radiation propagating within said first core and a second optical path corresponding to radiation propagating within said second core, wherein said paths have an optical path difference over said sensor length section; and
analysing means for analysing radiation output from the fibre assembly and developing and spectrally dispersing interferograms formed between the radiation propagating in the first and second optical paths and for providing a temperature output determined from phase variations in said interferograms.

25. A bend sensor comprising:
a fibre assembly including a multicore optical fibre having component cores sufficiently separated to counteract crosstalk and a sensor length section;
a coupler coupling radiation propagating in a first core of said component cores into a second core of the component cores of the fibre assembly;
reflectors reflecting a portion of incident radiation, said reflectors and said coupler arranged such as to define a first optical path corresponding to radiation propagating within said first core and a second optical path corresponding to radiation propagating within said second core, wherein said paths have an optical path difference over said sensor length section; and
an interferometric analyser analysing radiation output from the fibre assembly and developing and spectrally dispersing interferograms formed between the radiation propagating in the first and second optical paths and for providing a fibre curvature output determined from phase variations in said interferograms.

26. A temperature sensor comprising:
a fibre assembly including a multicore optical fibre having component cores sufficiently separated to counteract crosstalk and a sensor length section;
a coupler coupling radiation propagating in a first core of said component cores into a second core of the component cores of the fibre assembly;
a reflectors for reflecting a portion of incident radiation, said reflectors and said coupler arranged such as to define a first optical path corresponding to radiation propagating within said first core and a second optical path corresponding to radiation propagating within said second core, wherein said paths have an optical path difference over said sensor length section; and
an interferometric analyser analysing radiation output from the fibre assembly and developing and spectrally dispersing interferograms formed between the radiation propagating in the first and second optical paths and for providing a temperature output determined from phase variations in said interferograms.

27. A method of sensing a bend in an optical fibre, said method comprising the steps of:
providing a multicore optical fibre having component cores sufficiently separated to counteract crosstalk and a sensor length section;
coupling radiation propagating in a first core of said component cores into a second core of the component cores of the fibre assembly;
reflecting a portion of incident radiation, said reflecting step and said coupling step arranged such as to define a first optical path corresponding to radiation propagating within said first core and a second optical path corresponding to radiation propagating within said second core, wherein said paths have an optical path difference over said sensor length section; and analysing radiation output from the optical fibre and developing and spectrally dispersing interferograms formed between the radiation propagating in the first and second optical paths and for providing a fibre curvature output determined from phase variations in said interferograms.

* * * * *

UNITED STATES PATENT AND TRADEMARK OFFICE
CERTIFICATE OF CORRECTION

PATENT NO. : 6,389,187 B1
DATED : May 14, 2002
INVENTOR(S) : Greenaway et al.

It is certified that error appears in the above-identified patent and that said Letters Patent is hereby corrected as shown below:

<u>Column 20,</u>
Line 43, "a reflectors" should read -- reflectors --

Signed and Sealed this

Twenty-third Day of July, 2002

Attest:

Attesting Officer

JAMES E. ROGAN
*Director of the United States Patent and Trademark Office*